Jan. 3, 1933.   J. RUTHS   1,892,967
ENERGY DISTRIBUTION SYSTEM
Filed May 26, 1930
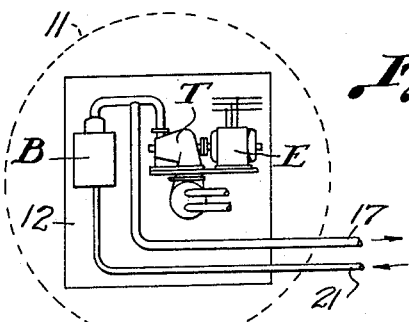
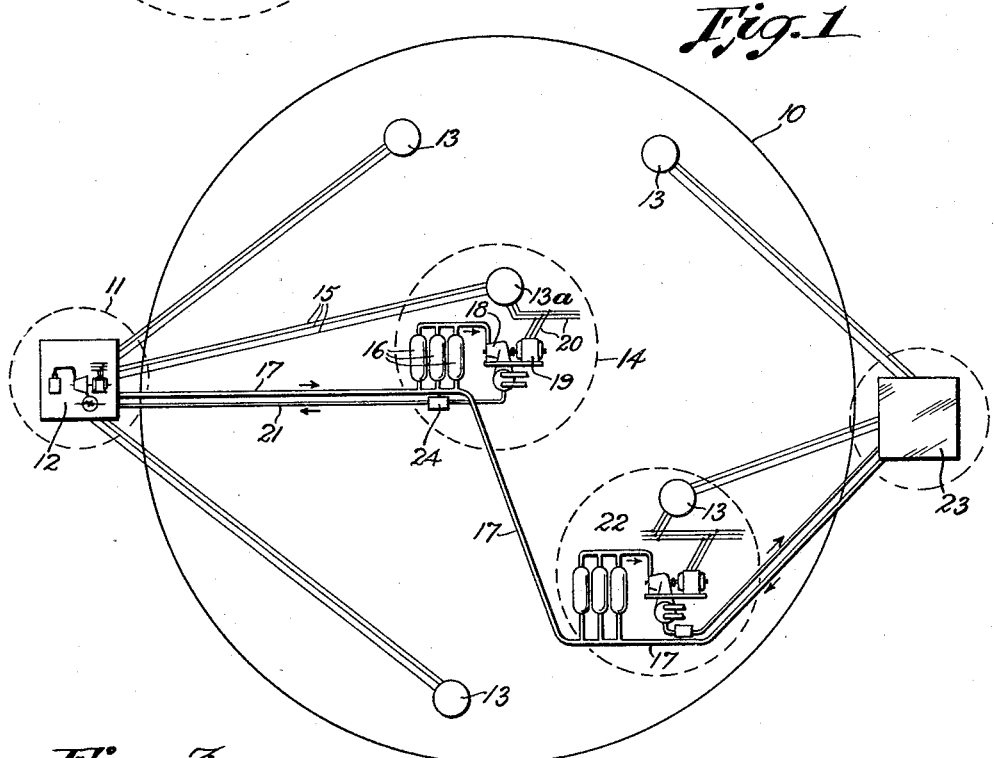
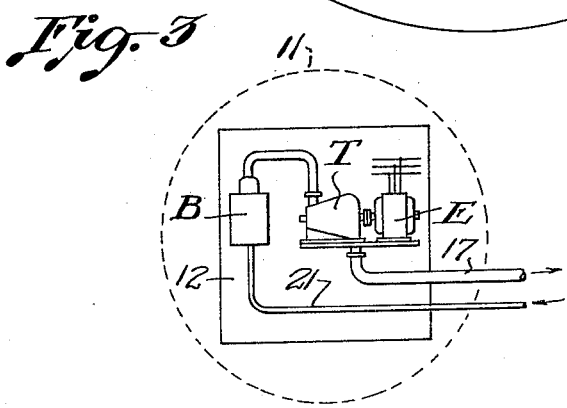
INVENTOR
Johannes Ruths
BY
his ATTORNEY Patented Jan. 3, 1933

1,892,967

UNITED STATES PATENT OFFICE

JOHANNES RUTHS, OF DJURSHOLM, SWEDEN, ASSIGNOR TO RUTHSACCUMULATOR A. B., OF BERLIN, GERMANY, A CORPORATION OF SWEDEN

ENERGY DISTRIBUTION SYSTEM

Application filed May 26, 1930, Serial No. 455,939, and in Germany June 26, 1929.

My invention relates to distribution of energy and particularly to the distribution of electrical energy from central power stations and within municipalities.

Electricity used in municipalities for heat, light and power is usually generated in central stations. Central stations are growing larger in size and are transmitting power over great distances. Central power stations are also being removed from the centers of municipalities and are being placed in localities which are somewhat outside the more congested district of population. There are several reasons for this remote generation of electricity from the place of consumption including cost of real estate and smoke nuisances.

The cost of distribution of electrical energy is high. The electricity generated at the central power station is usually stepped up to a high voltage. It may, for example, be generated at 6,000 volts and stepped up by transformers to 40,000 volts. It is then carried at such high voltage preferably by underground transmission lines, to one or more points of distribution where it is transformed down to the usual operating voltage or voltages.

It is well known that the load on a central power station fluctuates widely. At certain times of the day the load may be more than double what it is at other times. In certain towns and cities the peaks are extraordinarily high, as at from five to seven o'clock in the evening. Since electricity is generated in accordance with demand, these transmission lines must be of a nature to transmit the maximum load and the peak may extend for only a few hours.

The present invention aims to reduce this high cost of energy transmission. In order to accomplish this object I transmit energy by different carriers and at different rates. In accordance with the invention, the base load is conveyed, as usual, by electric transmission. The energy for supplying the peak load is not conveyed by electric lines, or not so conveyed to as great an extent as formerly, but I transmit the peak load in the form of a continuous, preferably uniform, flow of heat conveying fluid such as steam or water and use an accumulator to store the energy transmitted for use during the peak. Thus I provide a dual carrier, and the transmission system operates in a distinctly different manner from the present manner of conveying municipal electric loads and the like.

To illustrate the invention I have made the accompanying drawing which shows, diagrammatically, a system in accordance with the invention for distributing energy from one or more central power stations to municipalities with some alternative features as will appear.

Referring to the drawing:
Fig. 1 shows the system in general;
Fig. 2 shows a specific arrangement of part of the system in one form; and
Fig. 3 shows an alternative form of part of the system.

The circle 10 designates the borders of a municipality. On the outskirts of the municipality in the locality 11 is a central power station 12. This central power station has the usual steam generator or boiler B, prime mover T and electric generator E driven by the prime mover. It also has one or more transformers for stepping up the voltage to, for example, forty or fifty thousand volts. Transformers for distributing electrical current at various points in the municipality are indicated at 13. Of these I have selected the transformer 13a to show the application of the present invention. This transformer is situated in a locality 14 which is remote from the locality 11. The base load for the points of consumption supplied from transformer 13a is transmitted by the high tension electric lines 15.

In locality 14 which represents a place of unusually heavy peak loads, I place an accumulator comprising one or more large vessels 16 capable of holding a considerable quantity of water. A steam line 17 conveys steam from the central power station 12 to the accumulator 16. Steam line 17 may be connected to receive steam direct from the steam generator of the central power station as shown in Fig. 2 or from the exhaust or outlet of the prime mover as shown in Fig. 3.

In locality 14 is also a prime mover 18, which may be a turbine, driving an electrical generator 19 which is connected with the low voltage lines 20 leading from the transformer 13a. The above equipment situated in locality 14 may be said to constitute a sub-station. Since it is possible to have an even flow of steam through the steam pipe 17 throughout the twenty-four hours of the day, this steam pipe can be designed to take care of the average current consumption of the peak above the base load. I have found that the size of this pipe can be appreciably small. Such steam pipes are not customary in engineering practice at present since the view is generally taken that high pressure steam cannot be conveyed over long distances. This is erroneous and I have found that, for example, with a permissible overall pressure drop of 150 pounds per square inch and an initial pressure of 350 pounds per square inch, steam can be conveyed through a 12 inch pipe for a distance for somewhat over 6 miles to supply a 100,000 kilowatt hour peak without any noticeable heat loss.

Steam is conveyed from the accumulator to the prime mover 18 in the usual manner and the condensate may be collected in a storage tank 24 from which it can be conveyed in a small steady stream through a conduit 21 back to the central station. Obviously the return conduit need not be used and the hot water may be used in other ways. At 22 I have shown another sub-station comprising a storage system which would operate in the same manner as above described. Where there are several central power stations on the outskirts of the municipality, as at 12 and 23, it may be advisable to interconnect them by means of the steam conduit 17. The steam which is transmitted through conduit 17 may be first caused to flow through back pressure turbines in the central stations before the long distance transmission.

It may be of advantage under certain circumstances to use back pressure turbines in the central power stations, as shown in Fig. 3 for carrying all, or substantially all, of the load, which would be in operation during the twenty-four hours and to have condensing turbines at the points of distribution with an accumulator plant in between them.

The principal advantage of the above described arrangement is that the cost of transmitting energy is extremely low compared to the present practice of transmitting all the electricity by electrical transmission lines, since, in accordance with the invention, the transmission lines convey only the base load while the production of the peak load current takes place in the proximity of the consumer. Also, by means of the invention, considerable smoke nuisance may be eliminated. And furthermore, it is possible to obtain a more sensitive response to load demands. It will be readily seen that the same advantages apply even though the central power station is not at the outskirts of the municipality but is within it. Conduit 17 instead of conducting steam may conduct hot water to the accumulators. The accumulators may discharge steam directly into a prime mover or the hot water may be passed through hot water motors. Small heating units may be employed in connection with the accumulators. Obviously the accumulators and the steam lines may be suitably insulated.

Having thus described my invention, what I claim is:

1. The combination with a network for supplying a variable demand for electrical energy in a given locality and a central power station remote from said network including a steam producer, a prime mover driven by steam from said steam producer, and an electric generator driven by said prime mover, of a sub-station adjacent to said network comprising a steam accumlator, a prime mover driven from said steam accumulator and an electric generator driven by the last-mentioned prime mover and connected with said network, long electric transmission lines connecting the electric generator of the central station with said network of less capacity than necessary to carry the total load and of sufficient capacity to carry the base load, and a long pipe line beween the central station and the accumulator of such size as to conduct steam in a continuous stream to furnish a total supply sufficient to care for peak load requirements and smaller than sufficient to care for the maximum peak load.

2. The combination with a network for supplying a variable demand for electrical energy in a given locality and a central power station remote from said network including a boiler, a prime mover driven from said boiler, and an electric generator driven by said prime mover, of a sub-station adjacent to said network comprising an accumulator, a prime mover driven from said accumulator and an electric generator driven by the last-mentioned prime mover and connected with said network, long electric transmission lines connecting the electric generator of the central station with said network of less capacity than necessary to carry the total load and of sufficient capacity to carry the base load, and a long pipe line between the central station and the accumulator of such size as to conduct heat conveying fluid in a continuous stream to furnish a total supply sufficient to care for peak load requirements and smaller than sufficient to care for the maximum peak load.

3. The combination with a network for supplying a variable demand for electrical energy in a given locality and a central power station remote from said network including a steam producer, a prime mover driven by steam from said steam producer, and an electric generator driven by said prime mover, of a sub-station adjacent to said network comprising a steam accumulator, a prime mover driven from said steam accumulator and an electric generator driven by the last-mentioned prime mover and connected with said network, long electric transmission lines connecting the electric generator of the central station with said network of less capacity than necessary to carry the total load and of sufficient capacity to carry the base load, a long pipe line between the central station and the accumulator of such size as to conduct steam in a continuous stream to furnish a total supply sufficient to care for peak load requirements and smaller than sufficient care for the maximum peak load, a small pipe line for conducting condensate from the prime mover in the sub-station to the steam producer in the central station, and a reservoir in the last-mentioned pipe line.

4. The combination with a network for supplying a variable demand for electrical energy in a given locality and a central power station remote from said network including a steam producer, a prime mover driven by steam from said steam producer, and an electric generator driven by said prime mover, of a sub-station adjacent to said network comprising a steam accumulator, a prime mover driven from said steam accumulator and an electric generator driven by the last-mentioned prime mover and connected with said network, long electric transmission lines connecting the electric generator of the central station with said network of less capacity than necessary to carry the total load and of sufficient capacity to carry the base load, and a long pipe line connecting the steam producer in the central station with the accumulator of such size as to conduct steam in a continuous stream to furnish a total supply sufficient to care for peak load requirements and smaller than sufficient to care for the maximum peak load.

5. The combination with a network for supplying a variable demand for electrical energy in a given locality and a central power station remote from said network including a steam producer, a prime mover driven by steam from said steam producer and having a steam outlet, and an electric generator driven by said prime mover, of a sub-station adjacent to said network comprising a steam accumulator, a prime mover driven from said accumulator and an electric generator driven by the last-mentioned prime mover and connected with said network, long electric transmission lines connecting the electric generator of the central station with said network of less capacity than necessary to carry the total load and of sufficient capacity to carry the base load, and a long pipe line connecting the steam outlet of the prime mover in the central station with the accumulator of such size as to conduct steam in a continuous stream to furnish a total supply sufficient to care for peak load requirements and smaller than sufficient to care for the maximum peak load.

In testimony whereof I have affixed my signature.

JOHANNES RUTHS.

CERTIFICATE OF CORRECTION.

Patent No. 1,892,967.　　　　　　　　　　　　　　　January 3, 1933.

JOHANNES RUTHS.

It is hereby certified that error appears in the printed specification of the above numbered patent requiring correction as follows: Page 3, line 16, claim 3, after "sufficient" insert the word "to"; and that the said Letters Patent should be read with this correction therein that the same may conform to the record of the case in the Patent Office.

Signed and sealed this 21st day of February, A. D. 1933.

(Seal)
　　　　　　　　　　　　　　　　　　　　　　M. J. Moore,
　　　　　　　　　　　　　　　　　　Acting Commissioner of Patents.